US012802382B2

(12) United States Patent
Xu et al.

(10) Patent No.: US 12,802,382 B2
(45) Date of Patent: Nov. 17, 2026

(54) TAB DETECTION SYSTEM AND TAB DETECTION METHOD

(71) Applicant: CONTEMPORARY AMPEREX TECHNOLOGY CO., LIMITED, Ningde (CN)

(72) Inventors: Xiaowei Xu, Ningde (CN); Lin Ma, Ningde (CN); Liangjin Hu, Ningde (CN)

(73) Assignee: CONTEMPORARY AMPEREX TECHNOLOGY CO., LIMITED, Ningde (CN)

(*) Notice: Subject to any disclaimer, the term of this patent is extended or adjusted under 35 U.S.C. 154(b) by 40 days.

(21) Appl. No.: 19/211,329

(22) Filed: May 19, 2025

(65) Prior Publication Data

US 2025/0278916 A1 Sep. 4, 2025

Related U.S. Application Data

(63) Continuation of application No. PCT/CN2024/092559, filed on May 11, 2024.

(30) Foreign Application Priority Data

Feb. 23, 2024 (CN) ......................... 202410200679.2

(51) Int. Cl.
*G06V 10/14* (2022.01)
*B08B 1/16* (2024.01)
(Continued)

(52) U.S. Cl.
CPC ................ *G06V 10/14* (2022.01); *B08B 1/16* (2024.01); *B08B 1/30* (2024.01); *B08B 13/00* (2013.01);
(Continued)

(58) Field of Classification Search
CPC ........ G06V 10/14; G06V 10/993; B08B 1/16; B08B 1/30; B08B 13/00; G02B 27/0006;
(Continued)

(56) References Cited

U.S. PATENT DOCUMENTS 5,815,314 A 9/1998 Sudo
2023/0064943 A1* 3/2023 Hu .................... H01M 10/4285
(Continued)

FOREIGN PATENT DOCUMENTS

CN 111077915 A 4/2020
CN 111735609 A 10/2020
(Continued)

OTHER PUBLICATIONS

Extended European Search Report, mailed May 18, 2026, for corresponding European Patent Application Serial No. 24905131.9.
(Continued)

*Primary Examiner* — Abdelaaziz Tissire
(74) *Attorney, Agent, or Firm* — K&L Gates LLP

(57) ABSTRACT

A tab detection system and a tab detection method are provided. The tab detection system includes: a control unit; an imaging unit; and a prism device, where the prism device includes: a prism table; a prism unit; and a driving unit, configured to enable the prism unit to move and/or rotate relative to the prism table, where the control unit iteratively performs the following operations until it is determined that a difference between an evaluation parameter of a tab image and a first threshold is not outside a predetermined range: sending a photographing control signal to the imaging unit; calculating the tab image to obtain the evaluation parameter; and in response to determining that the difference between the evaluation parameter and the first threshold is outside the predetermined range, enabling the prism unit to move and/or rotate at a specified step length relative to the prism table.

17 Claims, 8 Drawing Sheets

(51) Int. Cl.

| | |
|---|---|
| ***B08B 1/30*** | (2024.01) |
| ***B08B 13/00*** | (2006.01) |
| ***G02B 27/00*** | (2006.01) |
| ***G06V 10/98*** | (2022.01) |
| ***H04N 23/60*** | (2023.01) |

(52) U.S. Cl.
CPC ....... *G02B 27/0006* (2013.01); *G06V 10/993* (2022.01); *H04N 23/64* (2023.01)

(58) Field of Classification Search
CPC ........ H04N 23/64; H04N 23/55; H04N 23/57; H04N 23/58; H04N 23/61; G01N 21/8806; G01N 21/8851; G01N 21/94
See application file for complete search history.

(56) References Cited

U.S. PATENT DOCUMENTS

| | | | | |
|---|---|---|---|---|
| 2024/0003822 | A1* | 1/2024 | Tu | G01N 21/8806 |
| 2024/0095902 | A1* | 3/2024 | Huang | G06T 7/0006 |
| 2024/0154263 | A1* | 5/2024 | Huang | H01M 50/249 |
| 2024/0171840 | A1* | 5/2024 | Zhang | G03B 17/561 |
| 2025/0035560 | A1* | 1/2025 | Zhao | H01M 10/0583 |
| 2025/0124568 | A1* | 4/2025 | Tu | G01N 21/95 |
| 2025/0329006 | A1* | 10/2025 | Lee | G06T 7/0004 |
| 2025/0362252 | A1* | 11/2025 | Lin | G01N 23/18 |
| 2026/0100395 | A1* | 4/2026 | Vasko | H01M 10/0404 |

FOREIGN PATENT DOCUMENTS

| | | | | | |
|---|---|---|---|---|---|
| CN | 112904766 | A | | 6/2021 | |
| CN | 114018931 | A | | 2/2022 | |
| CN | 114609153 | A | | 6/2022 | |
| CN | 114674832 | A | | 6/2022 | |
| CN | 115586191 | A | * | 1/2023 | G01N 21/8806 |
| CN | 219122062 | U | | 6/2023 | |
| CN | 117538329 | A | | 2/2024 | |
| CN | 117538335 | A | | 2/2024 | |
| CN | 117782994 | A | | 3/2024 | |
| EP | 4166935 | A1 | | 4/2023 | |
| JP | 2004046132 | A | | 2/2004 | |
| JP | 2009159311 | A | | 7/2009 | |
| JP | 2019149440 | A | | 9/2019 | |
| KR | 20070057479 | A | | 6/2007 | |
| KR | 20080034275 | A | | 4/2008 | |
| WO | 2024011984 | A1 | | 1/2024 | |

OTHER PUBLICATIONS

International Search Report of PCT Application No. PCT/CN2024/092559, mailed Aug. 23, 2024, 10 pages with English translation.
Written Opinion of PCT Application No. PCT/CN2024/092559, mailed Aug. 23, 2024, 12 pages with English translation.
First Office Action of CN Application No. 202410200679.2, mailed Apr. 3, 2024, 19 pages with English translation.
Grant Notice of CN Application No. 202410200679.2, mailed Apr. 19, 2024, 5 pages with English translation.

* cited by examiner

TAB DETECTION SYSTEM AND TAB DETECTION METHOD

CROSS-REFERENCE TO RELATED APPLICATIONS

The present application is a continuation of PCT Application No. PCT/CN2024/092559, filed on May 11, 2024, which claims priority to and benefits of Chinese Patent Application No. 202410200679.2, filed on Feb. 23, 2024. The entire content of the above-referenced application is incorporated herein by reference.

TECHNICAL FIELD

The present application relates to the field of battery detection, and specifically, to a tab detection system and a tab detection method.

BACKGROUND

During assembly of a lithium battery, battery cell production processes mainly include a winding process and a laminating process. No matter in the winding process or in the laminating process, a thickness of a tab (for example, a material of the tab is an aluminum foil or a copper foil) of each of a cathode and an anode of a battery cell is only at a micrometer level. As a result, the tab has a relatively low strength, and the tab of each of the cathode and the anode may be folded or even may be damaged during battery cell production. In view of this, at present, there is a device using an imaging detection device to detect a status of the tab of the battery cell. An important link for such imaging detection device is to obtain a tab image by using a camera. However, a gap between tabs in the battery cell is excessively small, and it is difficult to directly photograph an inner side and an outer side of the tab. Therefore, a prism device is generally used to obtain the tab image. However, in the existing imaging detection device, a relative position relationship between a prism and the tab needs to be adjusted manually to obtain a clear image. The manual adjustment consumes a lot of time and efforts, and greatly depends on experience, knowledge, and subjective cognition of an operator. As a result, it is difficult to accurately, objectively, and automatically obtain a clear tab image.

SUMMARY

The present application provides a tab detection system and a tab detection method, so that a tab image can be obtained quickly and clearly.

According to a first aspect, the present application provides a tab detection system. The tab detection system includes: a control unit, configured to output a photographing control signal to an imaging unit and output a driving control signal to a driving unit; the imaging unit, configured to photograph a tab through a prism unit according to the photographing control signal to obtain a tab image; and a prism device, where the prism device includes: a prism table; the prism unit, configured to project the tab image to the imaging unit through refraction and arranged on the prism table in a manner of being movable relative to the prism table; and the driving unit, configured to enable, according to the driving control signal of the control unit, the prism unit to move and/or rotate relative to the prism table, where the control unit is configured to iteratively perform the following operations until it is determined that a difference between an evaluation parameter of the tab image and a first threshold is not outside a predetermined range: sending the photographing control signal to the imaging unit; calculating the tab image captured by the imaging unit to obtain the evaluation parameter of the tab image; and in response to determining that the difference between the evaluation parameter and the first threshold is outside the predetermined range, outputting the driving control signal to the driving unit to enable the prism unit to move and/or rotate at a specified step length relative to the prism table.

In the technical solutions of the embodiments of the present application, the control unit automatically determines whether a currently captured tab image meets a predetermined requirement, and automatically adjusts the prism unit in a case that the predetermined requirement is not met until the prism unit can capture a clear tab image. Therefore, there is no need to perform manual adjustment and consume a lot of labors and efforts, and a clear tab image can be obtained quickly and automatically.

In some embodiments, the control unit includes: an upper computer, configured to control the imaging unit to capture the tab image, calculate, in response to capturing the tab image by the imaging unit, the tab image to obtain the evaluation parameter of the tab image, and send the evaluation parameter to a lower computer; and the lower computer, arranged on the prism device, and configured to: determine, in response to receiving the evaluation parameter from the upper computer, whether the difference between the evaluation parameter and the first threshold is outside the predetermined range; and if the difference between the evaluation parameter and the first threshold is outside the predetermined range, output the driving control signal to the driving unit to enable the prism unit to move and/or rotate at the specified step length relative to the prism table, and send a request for requesting the imaging unit to capture an image to the upper computer.

In the technical solutions of the embodiments of the present application, the upper computer performs an overall control over the system and calculation processing with a relatively large calculation amount, and the lower computer performs control for the corresponding prism device according to a calculation result of the upper computer, so that a more complex embedded system function can be implemented.

In some embodiments, the driving unit includes: a translation direction driving device, configured to enable the prism unit to move in a translation direction; and a rotation direction driving device, configured to enable the prism unit to rotate around a central shaft of the prism unit.

In some embodiments, a sliding groove is provided on the prism table, and the sliding groove extends in the translation direction; the translation direction driving device includes: a sliding block, slidably arranged in the sliding groove; and a translation driver, configured to enable, according to the driving control signal of the control unit, the sliding block to move in the translation direction along the sliding groove; and the rotation direction driving device includes: a rotation driver, where the rotation driver is configured to enable, according to the driving control signal of the control unit, the prism unit to rotate around the central shaft of the prism unit, and the rotation driver is arranged on the sliding block.

In some embodiments, the translation direction is a length direction of the prism table, and the central shaft is perpendicular to a surface direction of the prism table.

In some embodiments, the prism unit includes a prism support, a prism lens, and the central shaft, where one end of the central shaft is connected to the prism support, and the other end is rotatably arranged on the sliding block.

In some embodiments, the prism device further includes a cleaning device, and the control unit is further configured to: in a case that the evaluation parameter is less than or equal to a second threshold, output a cleaning control signal to the cleaning device, to enable the cleaning device to clean the prism unit.

In the technical solutions of the embodiments of the present application, the tab detection system can automatically determine an occasion for performing cleaning processing without manual intervention, thereby improving the operating efficiency. In addition, the prism unit can also be cleaned even in a power-on state, so that the photographing efficiency can be improved.

In some embodiments, the cleaning device includes: a wiping strip, in contact with the prism unit; and a cleaning driver, configured to enable, according to the cleaning control signal, the wiping strip to move in a specified direction to clean the prism unit.

In some embodiments, the prism device further includes a shock-absorbing device, where the shock-absorbing device is arranged on a first side surface of the prism table, the first side surface is a side surface different from a second side surface on which the prism unit is configured, and the prism device is fixed to the tab detection system through the shock-absorbing device.

In the technical solutions of the embodiments of the present application, by arranging the shock-absorbing device, vibration from the tab detection system or the outside is filtered, to prevent imaging deterioration such as a virtual shadow or a focusing loss during imaging, so that a clear tab image can be captured.

In some embodiments, before detection is performed on the tab, the control unit controls the driving unit to enable at least one of a position or a rotation angle of the prism unit relative to the prism table to be reset to a predetermined value.

In the technical solutions of the embodiments of the present application, before detection is performed on the tab, the control unit controls the driving unit to enable at least one of the position or the rotation angle of the prism unit relative to the prism table to be reset to the predetermined value, so that a posture of the prism unit can be initialized into a default optimal posture. Therefore, time required for obtaining a clear tab image through photographing is reduced, and corresponding predetermined values can be set respectively for different battery types.

In some embodiments, the prism device includes a first prism unit and a second prism unit, where the first prism unit includes a first driving unit, the second prism unit includes a second driving unit, and the first prism unit and the second prism unit are configured to measure a positive electrode tab and a negative electrode tab respectively.

In the technical solutions of the embodiments of the present application, the positive electrode tab and the negative electrode tab of the battery can be detected simultaneously, thereby reducing photographing time and improving the operating efficiency.

In some embodiments, the control unit is configured to: control the first prism unit and the second prism unit to be reset at a preset angle, to enable the first prism unit and the second prism unit to be reset to preset positions according to a gap between the tabs; in response to determining that the difference between the evaluation parameter and the first threshold is outside the predetermined range, enable the first prism unit and the second prism unit to rotate toward a first rotation direction and/or move toward a first translation direction to increase the gap, where adjustment is performed by using the preset angle and/or a preset distance each time; and in response to determining that a difference between the evaluation parameter of the tab image and the first threshold obtained after the first prism unit and the second prism unit are adjusted is increased compared with that before the adjustment, enable the first prism unit and the second prism unit to rotate toward a second rotation direction opposite to the first rotation direction and/or move toward a second translation direction opposite to the first translation direction.

According to a second aspect, the present application provides a tab detection method, applied to a tab detection system, where the tab detection system includes a control unit, an imaging unit, and a prism device, the imaging unit is configured to photograph a tab to obtain a tab image, and the prism device includes: a prism table; the prism unit, configured to project the tab image to the imaging unit through refraction and arranged on the prism table in a manner of being movable relative to the prism table; and a driving unit, configured to enable, according to a driving control signal of the control unit, the prism unit to move and/or rotate relative to the prism table; and the tab detection method includes: iteratively performing the following operations until it is determined that a difference between an evaluation parameter of the tab image and a first threshold is not outside a predetermined range: photographing, by the imaging unit, the tab to obtain the tab image; calculating, by the control unit, the tab image to obtain the evaluation parameter of the tab image; and in response to determining that the difference between the evaluation parameter and the first threshold is outside the predetermined range, controlling, by the control unit, the prism unit to move and/or rotate at a specified step length relative to the prism table of the prism device.

In the technical solutions of the embodiments of the present application, whether a currently captured tab image meets a predetermined requirement can be automatically determined, and the prism unit is automatically adjusted in a case that the predetermined requirement is not met until the prism unit can capture a clear tab image. Therefore, there is no need to perform manual adjustment and consume a lot of labors and efforts, and a clear tab image can be obtained quickly and automatically.

In some embodiments, the control unit includes: an upper computer, configured to control the imaging unit to capture an image; and a lower computer, arranged on the prism device; and the tab detection method includes: calculating, by the upper computer in response to capturing the tab image by the imaging unit, the tab image to obtain the evaluation parameter of the tab image, and sending the evaluation parameter to the lower computer; and determining, by the lower computer in response to receiving the evaluation parameter from the upper computer, whether the difference between the evaluation parameter and the first threshold is outside the predetermined range; and if the difference between the evaluation parameter and the first threshold is outside the predetermined range, outputting the driving control signal to the driving unit to enable the prism unit to move and/or rotate at the specified step length relative to the prism table, and sending a request for requesting the imaging unit to capture an image to the upper computer.

In the technical solutions of the embodiments of the present application, the upper computer performs an overall control over the system and calculation processing with a relatively large calculation amount, and the lower computer performs control for the corresponding prism device according to a calculation result of the upper computer, so that a more complex embedded system function can be implemented.

In some embodiments, the prism device further includes a cleaning device, and in a case that the evaluation parameter is less than or equal to a second threshold, the control unit outputs a cleaning control signal to the cleaning device, to enable the cleaning device to clean the prism unit.

In the technical solutions of the embodiments of the present application, the tab detection system can automatically determine an occasion for performing cleaning processing without manual intervention, thereby improving the operating efficiency. In addition, the prism unit can also be cleaned even in a power-on state, so that the photographing efficiency can be improved.

In some embodiments, before detection is performed on the tab, the control unit controls the driving unit to enable at least one of a position or a rotation angle of the prism unit relative to the prism table to be reset to a predetermined value.

In the technical solutions of the embodiments of the present application, before detection is performed on the tab, the control unit controls the driving unit to enable at least one of the position or the rotation angle of the prism unit relative to the prism table to be reset to the predetermined value, so that a posture of the prism unit can be initialized into a default optimal posture. Therefore, time required for obtaining a clear tab image through photographing is reduced, and corresponding predetermined values can be set respectively for different battery types.

In some embodiments, the control unit is configured to: control a first prism unit and a second prism unit comprised in the prism unit to be reset at a preset angle, to enable the first prism unit and the second prism unit to be reset to preset positions according to a gap between the tabs; in response to determining that the difference between the evaluation parameter and the first threshold is outside the predetermined range, enable the first prism unit and the second prism unit to rotate toward a first rotation direction and/or move toward a first translation direction to increase the gap, where adjustment is performed by using the preset angle and/or a preset distance each time; and in response to determining that a difference between the evaluation parameter of the tab image and the first threshold obtained after the first prism unit and the second prism unit are adjusted is increased compared with that before the adjustment, enable the first prism unit and the second prism unit to rotate toward a second rotation direction opposite to the first rotation direction and/or move toward a second translation direction opposite to the first translation direction.

The foregoing description only refers to an overview of the technical solutions of the present application. In order to understand the technical means of the present application more clearly, it can be implemented according to the content of this specification. In order to make the above-mentioned and other objectives, features, and advantages of the present application more comprehensible, specific implementations of the present application are listed below.

BRIEF DESCRIPTION OF THE DRAWINGS

To describe the technical solutions of the embodiments of the present application more clearly, the following briefly describes the accompanying drawings required for describing the embodiments. It should be understood that, the following accompanying drawings show only some embodiments of the present application, which should not be considered as a limitation on the scope. A person of ordinary skill in the art may still derive other related accompanying drawings according to the accompanying drawings without creative efforts.

Figure 1A:
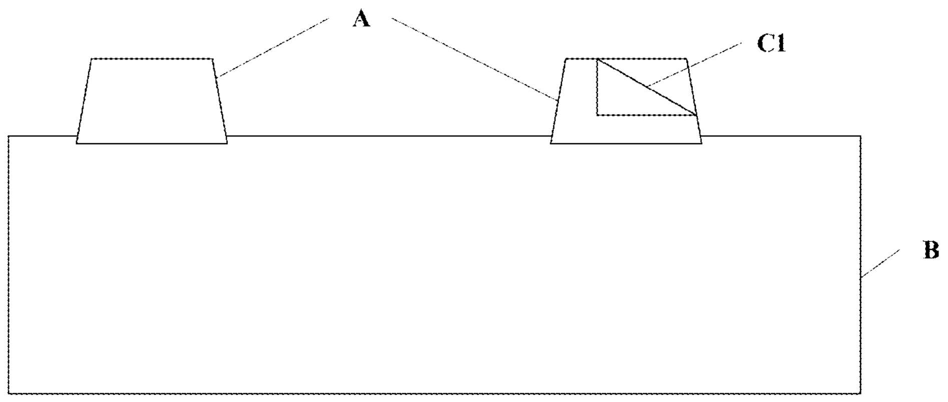
FIG. 1A is a schematic diagram of a tab A in a folded state.

Reference numerals in the specific implementations are as follows:

1: Tab detection system; 2: Battery; 11: Control unit; 12: Imaging unit; 13: Prism device; 131: Prism table; 132: Prism unit; 132A: First prism unit; 132B: Second prism unit; 133: Driving unit; 133A: First driving unit; 133B: Second driving unit; 1331: Translation direction driving device; 1332: Rotation direction driving device; 1311: Sliding groove; 1333: Sliding block; 1334: Translation driver; 1335: Rotation driver; 1321: Prism support; 1322: Prism lens; 1323: Central shaft; 134: Cleaning device; 15: Shock-absorbing device; 1341: Wiping strip; and 1342: Cleaning driver.

DETAILED DESCRIPTION

The embodiments of the technical solutions of the present application will be described in detail below with reference to the accompanying drawings. The following embodiments are only used to illustrate the technical solutions of the present application more explicitly, and are thus only interpreted as examples, rather than used to limit the protection scope of the present application.

Unless otherwise defined, all technical and scientific terms used in this specification have same meanings as those commonly understood by a person skilled in the art to which the present application belongs. The terms used in this specification are only intended to describe specific embodiments, and are not intended to limit the present application. The terms "include", "comprise", and any variants thereof in the specification and claims of the present application and the foregoing accompanying drawings are intended to cover non-exclusive inclusion.

In the description according to the embodiments of the present application, the technical terms "first", "second", and the like are only used to distinguish different objects, and should not be understood as indicating or implying relative importance or implicitly indicating a quantity, a specific order, or a primary and secondary relationship of indicated technical features. In the description according to the embodiments of the present application, unless otherwise expressly and specifically defined, "a plurality of" means two or more.

"Embodiment" mentioned in the specification means that particular features, structures, or characteristics described with reference to the embodiment may be included in at least one embodiment of the present application. The term appearing at different positions of the specification may not refer to the same embodiment or an independent or alternative embodiment that is mutually exclusive with another embodiment. A person skilled in the art explicitly or implicitly understands that the embodiments described in the specification may be combined with other embodiments.

In the description of the embodiments of the present application, the term "and/or" describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

In the description of the embodiments of the present application, the term "a plurality of" means two or more (including two). Similarly, "a plurality of groups" means two or more groups (including two groups), and "a plurality of pieces" means two or more pieces (including two pieces).

In the description of the embodiments of the present application, orientation or position relationships indicated by the technical terms such as "center", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial", and "circumferential" are based on orientation or position relationships shown in the accompanying drawings, and are only for the convenience of describing the present application and simplifying the description, rather than indicating or implying that the indicated device or element must have a specific orientation or must be configured and operated in a specific orientation. Therefore, such terms should not be construed as a limitation to the embodiments of the present application.

In the description of the embodiments of the present application, unless otherwise expressly specified and defined, the technical terms "mount", "connect", "connection", "fix", and the like should be understood in a broad sense. For example, the connection may be a fixed connection, a detachable connection, or an integral connection; or may be a mechanical connection or an electrical connection; or may be a direct connection, an indirect connection through an intermediary, or internal communication between two elements or a mutual interaction relationship between two elements. A person of ordinary skill in the art can understand specific meanings of the terms in the embodiments of the present application according to specific situations.

During assembly of a lithium battery, battery cell production processes mainly include a winding process and a laminating process. No matter in the winding process or in the laminating process, a thickness of a tab (for example, a material of the tab is an aluminum foil or a copper foil) of each of a cathode and an anode of a battery cell is only at a micrometer level. As a result, the tab has a relatively low strength, and the tab of each of the cathode and the anode may be folded or even may be damaged during battery cell production. FIG. 1A to FIG. 1H are schematic diagrams of a tab A in a folded state. FIG. 1A to FIG. 1H show eight folded states of the tab, and the eight folded states are only exemplary and are not exhaustive.

As shown in FIG. 1A, in a first folded state C1 of the tab A, the tab A is folded in a corner folding manner but is not folded to a film coating region B.

Figure 1B:
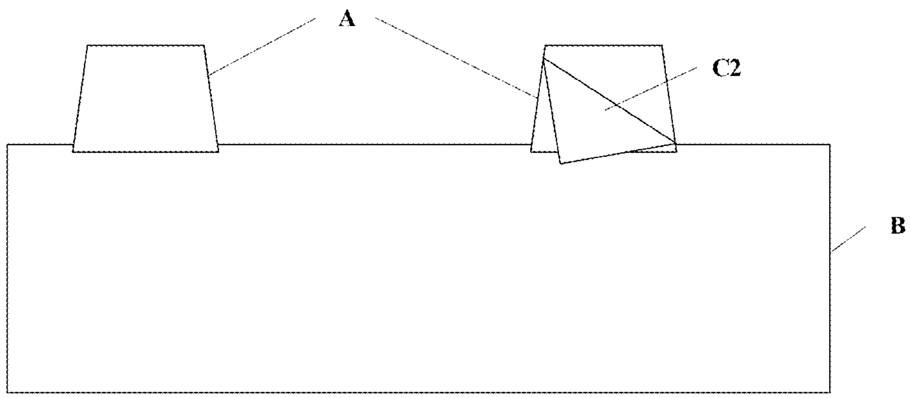
FIG. 1B is a schematic diagram of a tab A in another folded state.

As shown in FIG. 1B, in a second folded state C2 of the tab A, the tab A is folded in a corner folding manner and is folded to the film coating region B.

Figure 1C:
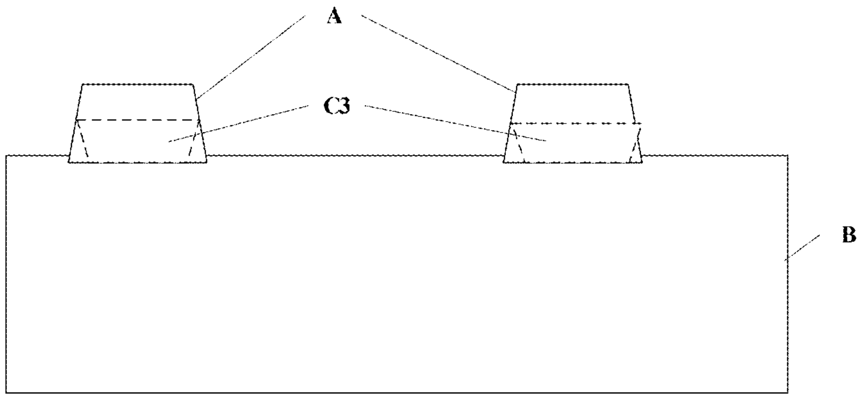
FIG. 1C is a schematic diagram of a tab A in another folded state.

As shown in FIG. 1C, in a third folded state C3 of the tab A, the tab A is folded in a manner of being parallel to a boundary between the tab and the film coating region but is not folded to the film coating region B.

Figure 1D:
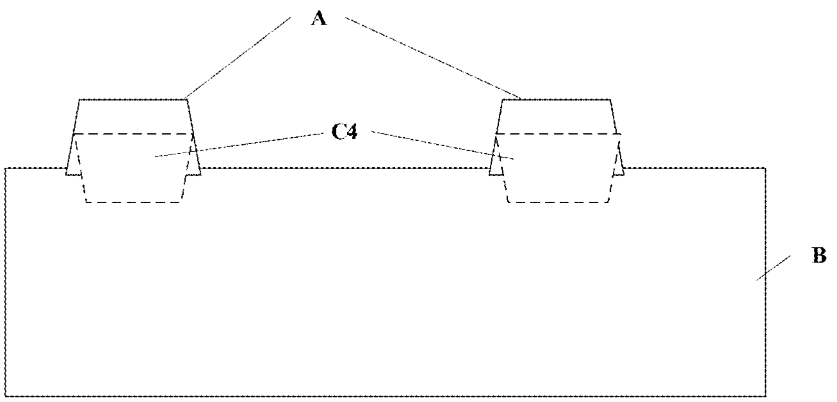
FIG. 1D is a schematic diagram of a tab A in another folded state.

As shown in FIG. 1D, the tab A is folded in a manner of being parallel to the boundary between the tab and the film coating region and is folded to the film coating region B.

Figure 1E:
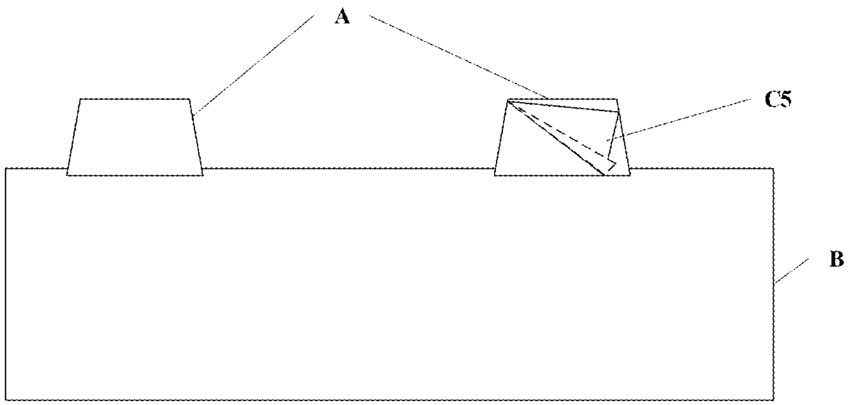
FIG. 1E is a schematic diagram of a tab A in another folded state.

As shown in FIG. 1E, the tab A is folded in an overlapped folding manner but is not folded to the film coating region B.

Figure 1F:
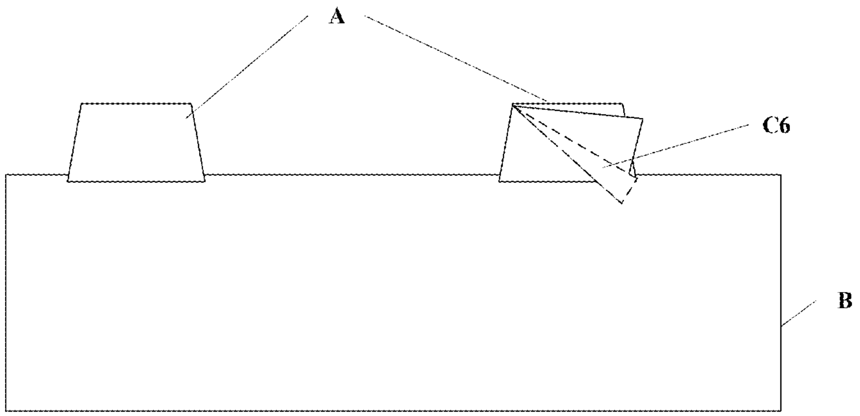
FIG. 1F is a schematic diagram of a tab A in another folded state.

As shown in FIG. 1F, the tab A is folded in an overlapped folding manner and is folded to the film coating region B.

Figure 1G:
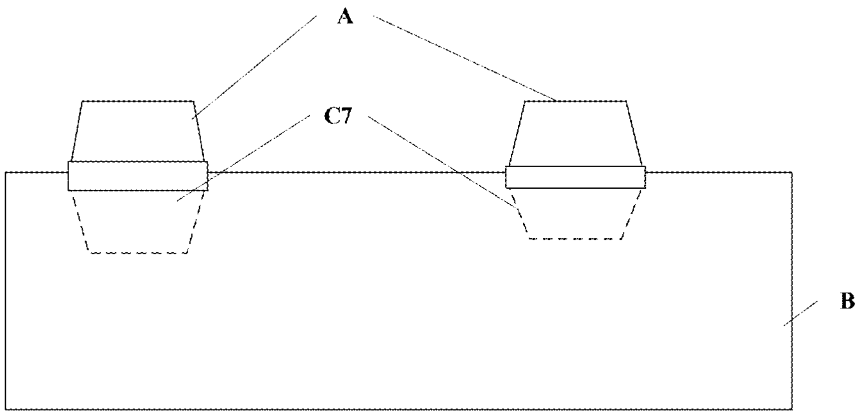
FIG. 1G is a schematic diagram of a tab A in another folded state.

As shown in FIG. 1G, a part of the tab A is folded to the film coating region B.

Figure 1H:
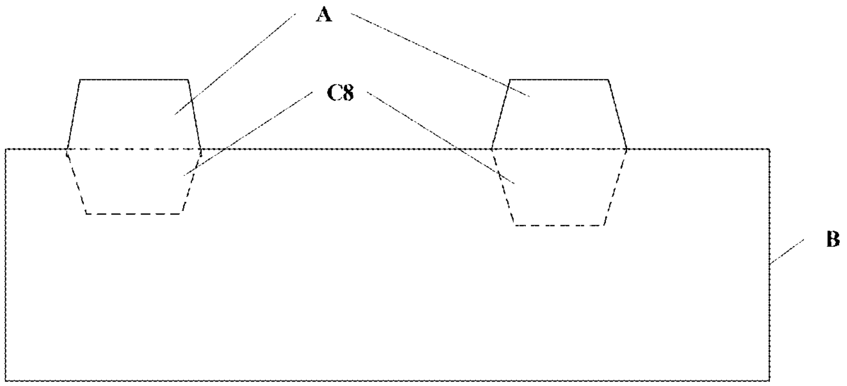
FIG. 1H is a schematic diagram of a tab A in another folded state.

As shown in FIG. 1H, the tab A is totally folded to the film coating region B.

For the folded states of the tab shown in FIG. 1B, FIG. 1D, FIG. 1F, FIG. 1G, and FIG. 1H, the tab has been folded to the film coating region, and a battery manufactured from a battery cell formed in these manners may encounter a phenomenon such as a low capacity, short circuit, or heat failure, affecting the safety of the battery. In the folded states of the tab shown in FIG. 1A, FIG. 1C, and FIG. 1E, although the tab is not folded to the film coating region, a risk that the tab is folded to the film coating region or the tab is poorly welded still exists during subsequent processing.

In view of this, at present, there is a device using an imaging detection device to detect a status of the tab of the battery cell. An important link for such imaging detection device is to obtain a clear tab image by using a camera. However, a gap between tabs in the battery cell is excessively small, and it is difficult to directly photograph an inner side and an outer side of the tab by using an imaging device. Therefore, a prism device is generally used to obtain the tab image. However, in the existing imaging detection device, relative positions of a prism and the tab need to be adjusted manually to obtain a clear image. For example, an operator first powers off and locks the device, then manually adjusts a fixing position of the prism to adjust the relative positions of the prism and the tab, locks screws after adjustment is completed, and then views imaging quality of the camera, to reach an optimal state identified by the operation by repeating this process. The manual adjustment consumes a lot of time and efforts, and greatly depends on experience, judgment, and subjective cognition of the operator. As a result, it is difficult to quickly and automatically obtain a clear tab image.

The inventor notices the problem and provides a tab detection system and method, which can quickly and automatically obtain a clear tab image. The tab detection system and method of the present disclosure may be applied to, for example, detection on a product line of a battery such as a lithium battery.

Figure 2:
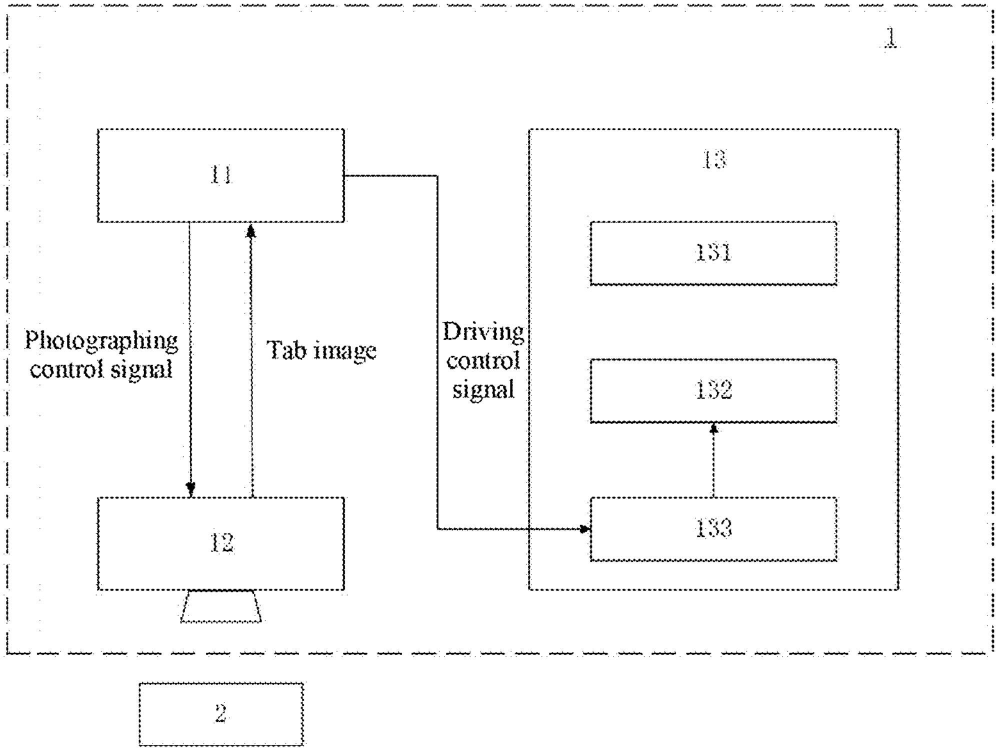
FIG. 2 is a block diagram of functional modules of a tab detection system disclosed according to an embodiment of the present application.

FIG. 2 is a block diagram of functional modules of a tab detection system disclosed according to an embodiment of the present application. As shown in FIG. 2, a tab detection system 1 includes a control unit 11, an imaging unit 12, and a prism device 13. The tab detection system 1 may be configured to photograph a tab of a battery 2 on a product line to obtain a clear tab image. The control unit 11 outputs a photographing control signal to the imaging unit 12, and outputs a driving control signal to a driving unit 133 of the prism device 13. The imaging unit 12 photographs, according to the photographing control signal from the control unit 11, the tab through a prism unit 132 to obtain the tab image. The prism device 13 includes a prism table 131, the prism unit 132, and the driving unit 133. The prism table 131 is configured to carry the prism unit 132 and the driving unit 133. The prism table 131 may be in any shape such as a plate or a table. The prism unit 132 projects the tab image to the imaging unit 12 through refraction and is arranged on the prism table 131 in a manner of being movable relative to the prism table 131. The driving unit 133 enables, according to the driving control signal of the control unit 11, the prism unit 132 to move and/or rotate relative to the prism table 131. The control unit 11 is configured to iteratively perform the following operations until it is determined that a difference between an evaluation parameter of the tab image captured by the imaging unit 12 and a first threshold is not outside a predetermined range: sending the photographing control signal to the imaging unit 12; calculating the tab image captured by the imaging unit 12 to obtain the evaluation parameter of the tab image; and in response to determining that the difference between the evaluation parameter and the first threshold is outside the predetermined range, outputting the driving control signal to the driving unit 133 to enable the prism unit 132 to move and/or rotate at a specified step length relative to the prism table 131.

For example, the battery 2 produced on the product line is transported to a to-be-detected position through a transportation device, and the prism unit 132 is arranged at a preset initial position. The control unit 11 of the tab detection system 1 first outputs the photographing control signal to the imaging unit 12. The imaging unit 12 receives the photographing control signal, photographs the tab through the prism unit 132 to obtain the tab image, and then sends the tab image to the control unit 11. The control unit 11 then calculates the evaluation parameter of the captured tab image, and determines whether the difference between the calculated evaluation parameter and the first threshold is outside the predetermined range. When it is determined that the difference between the calculated evaluation parameter and the first threshold is not outside the predetermined range, it means that the currently captured tab image is an image meeting a predetermined requirement; otherwise, it means that the currently captured tab image is an image not meeting the predetermined requirement. In a case of determining that the difference between the calculated evaluation parameter and the first threshold is outside the predetermined range (the currently captured tab image does not meet the predetermined requirement), the control unit 11 outputs the driving control signal to the driving unit 133 to enable the prism unit 132 to move and/or rotate at the specified step length relative to the prism table 131, to adjust a posture of the prism unit 132 relative to the tab of the battery 2. After the posture of the prism unit 132 is adjusted, the control unit 11 repeats the foregoing actions until it is determined that the difference between the calculated evaluation parameter and the first threshold is not outside the predetermined range.

The first threshold may be, but not limited to, an optimal value or a maximum value of an evaluation parameter for a battery of a specified type, which may be set by the operator according to an actual requirement. For example, the prism unit may be adjusted manually for the battery of the specified type in advance to obtain a tab image meeting the predetermined requirement, and the evaluation parameter calculated based on the tab image in this case is saved as the first threshold. In addition, the predetermined range may indicate that a deviation between the evaluation parameter of the actually captured tab image and the first threshold (for example, the maximum value of the evaluation parameter) is allowed. Due to various factors (for example, a temperature, humidity, vibration, light illuminance, or a halo) in an on-site environment aspect of the product line, a case that the evaluation parameter cannot reach the maximum value no matter how the prism unit is adjusted may occur. Therefore, by setting the predetermined range, it is considered that a tab image captured within the preset range has met the predetermined requirement.

According to the tab detection system 1 of this embodiment, the control unit automatically determines whether a currently captured tab image meets a predetermined requirement, and automatically adjusts the prism unit 132 in a case that the predetermined requirement is not met until the prism unit can capture a clear tab image. Therefore, there is no need to perform manual adjustment and consume a lot of labors and efforts, and a clear tab image can be obtained quickly and automatically.

Figure 3:
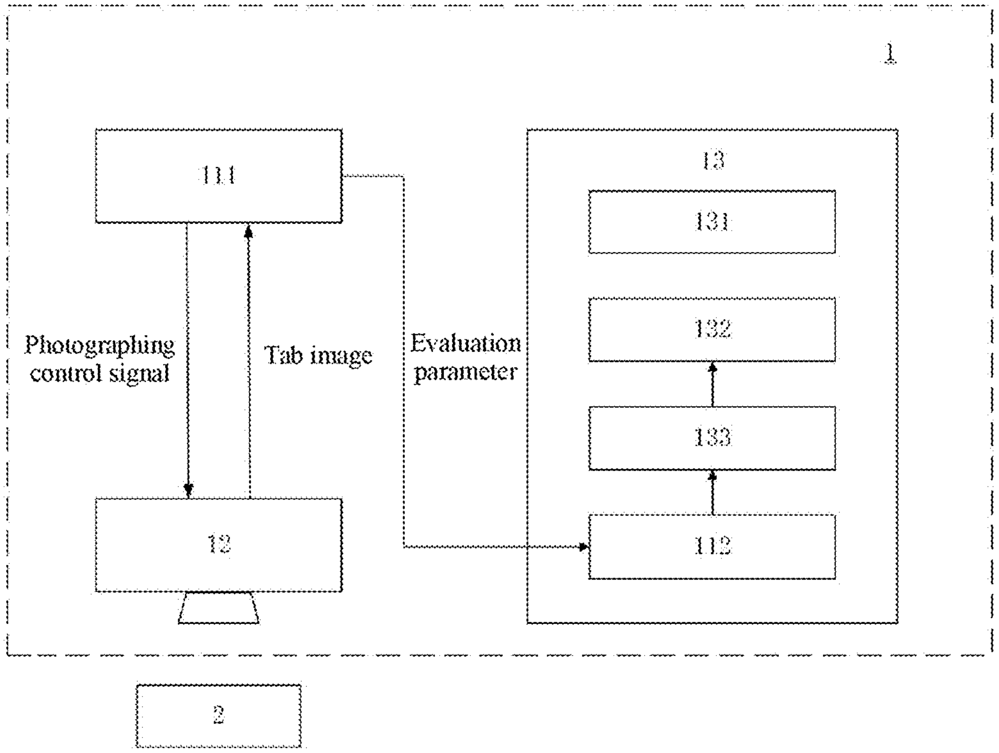
FIG. 3 is a block diagram of functional modules of a tab detection system disclosed according to an embodiment of the present application.

FIG. 3 is a block diagram of functional modules of a tab detection system disclosed according to an embodiment of the present application. According to an embodiment of the present application, optionally, the control unit 11 may include an upper computer 111 and a lower computer 112. The upper computer 111 may be configured to control the imaging unit 12 to capture the tab image, calculate, in response to capturing the tab image by the imaging unit 12, the tab image to obtain the evaluation parameter of the tab image, and send the evaluation parameter to the lower computer 112. The lower computer may be arranged on the prism device 13, and configured to: determine, in response to receiving the evaluation parameter from the upper computer 111, whether the difference between the evaluation parameter and the first threshold is outside the predetermined range; and if the difference between the evaluation parameter and the first threshold is outside the predetermined range, output the driving control signal to the driving unit 133 to enable the prism unit 132 to move and/or rotate at the specified step length relative to the prism table 131, and send a request for requesting the imaging unit 12 to capture an image to the upper computer 111. The upper computer 111 sends the photographing control signal to the imaging unit 12 after receiving the request.

According to this embodiment, the control unit 11 may be implemented as including the upper computer 111 and the lower computer 112. The upper computer 111 may implement functions of controlling the imaging unit 12, executing image processing, and calculating the evaluation parameter, and the lower computer 112 may control, according to an image processing result or the evaluation parameter from the upper computer 111, the driving unit 133 to adjust the posture of the prism unit 132. Through such configuration, the upper computer performs an overall control over the system and calculation processing with a relatively large calculation amount, and the lower computer performs control for the corresponding prism device according to a calculation result of the upper computer, so that a more complex embedded system function can be implemented.

Figure 4:
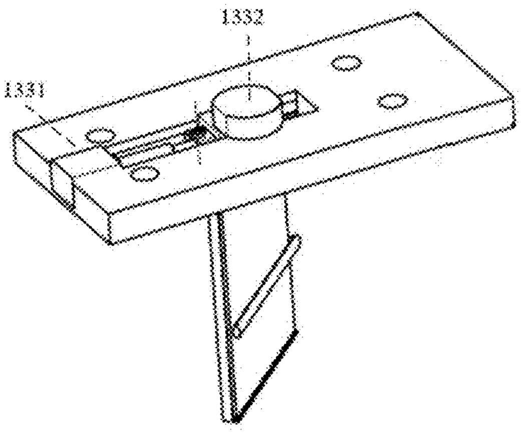
FIG. 4 is a three-dimensional structural diagram of a prism device of a tab detection system disclosed according to an embodiment of the present application.

FIG. 4 is a three-dimensional structural diagram of a prism device of a tab detection system disclosed according to an embodiment of the present application. According to this embodiment, optionally, the driving unit 133 of the prism device 13 may include a translation direction driving device 1331 and a rotation direction driving device 1332. The translation direction driving device 1331 enables the prism unit 132 to move at a predetermined step length in a translation direction, and the rotation direction driving device 1332 enables the prism unit 132 to rotate at a predetermined step length around a central shaft of the prism unit 132.

According to this embodiment, by configuring the translation direction driving device 1331 and the rotation direction driving device 1332, a posture of the prism relative to the tab can be adjusted in the translation direction and a rotation direction, to obtain a clear tab image.

Figure 5:
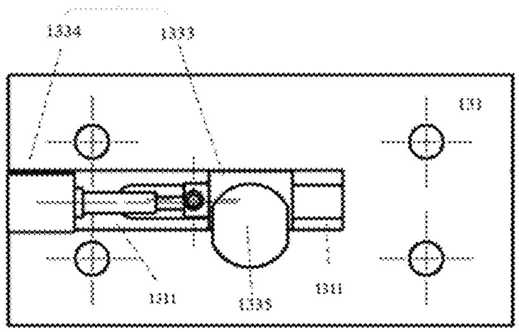
FIG. 5 is a top structural view of a prism device of a tab detection system disclosed according to an embodiment of the present application.

FIG. 5 is a top structural view of a prism device of a tab detection system disclosed according to an embodiment of the present application. In this embodiment, optionally, the prism table 131 may be provided with a sliding groove 1311, and the sliding groove 1311 extends in the translation direction; and the translation direction driving device 1331 includes: a sliding block 1333, slidably arranged in the sliding groove 1311; and a translation driver 1334, configured to enable, according to the driving control signal of the control unit 11, the sliding block 1333 to move in the translation direction along the sliding groove 1311. In addition, the rotation direction driving device includes a rotation driver 1335, and the rotation driver 1335 is configured to enable, according to the driving control signal of the control unit 11, the prism unit 132 to rotate around the central shaft of the prism unit 132. In an embodiment, the rotation driver is arranged on the sliding block 1333.

In an embodiment, optionally, as shown in FIG. 5, the translation direction may be a length direction (a left-right direction in the figure) of the prism table 131, and the central shaft is perpendicular to a surface direction of the prism table 131.

In an embodiment, optionally, the evaluation parameter may include at least one of a definition of the image, sharpness of the image, and a pixel variance of the image. It should be understood that, the evaluation parameter is not limited thereto, and any parameter that can represent imaging quality of the captured image may be used as the evaluation parameter. For example, in an example, the definition of the image may be represented by using a Brenner gradient function, where the Brenner gradient function is a gradient evaluation function and calculates a square of a grayscale difference between two adjacent pixels, and the function is defined as follows:

$$D(f) = \sum_y \sum_x |f(x2, y) - f(x, y)|^2 \qquad (1)$$

where f(x, y) represents a grayscale value of a pixel (x, y) corresponding to an image f, and D(f) is a calculation result of the definition of the image.

In another example, the definition of the image may alternatively be represented by using an energy gradient function. The energy gradient function uses a quadratic sum of a grayscale difference between adjacent pixels in an x direction and a y direction as a gradient value of each pixel and accumulates gradient values of all pixels to obtain a definition evaluation function value, whose expression is as follows:

$$D(f) = \sum_x \sum_y \{[f(x1, y) - f(x, y)]^2 [f(x, y1) - f(x, y)]^2\} \qquad (2)$$

where f(x, y) represents a grayscale value of a pixel (x, y) corresponding to an image f, and D(f) is a calculation result of the definition of the image.

Figure 6:
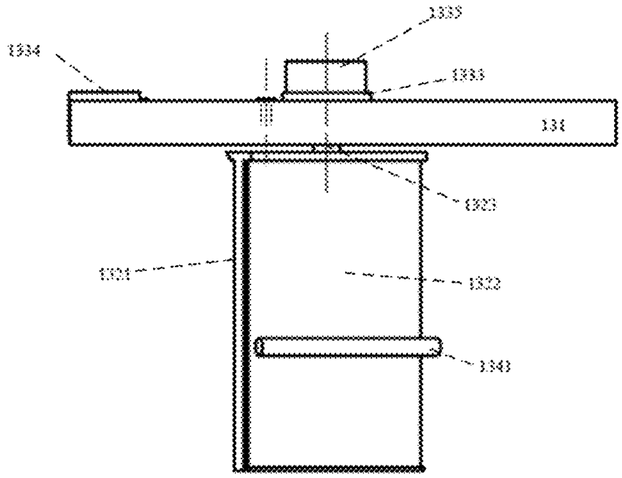
FIG. 6 is a front structural view of a prism device of a tab detection system disclosed according to an embodiment of the present application.
Figure 7:
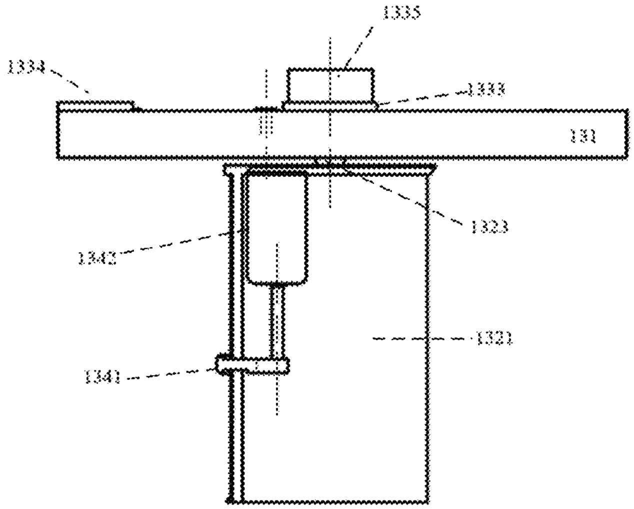
FIG. 7 is a front structural view of a prism device of a tab detection system disclosed according to an embodiment of the present application.

FIG. 6 is a front structural view of a prism device of a tab detection system disclosed according to an embodiment of the present application. FIG. 7 is a front structural view of a prism device of a tab detection system disclosed according to an embodiment of the present application. In this embodiment, optionally, the prism unit 132 may include a prism support 1321, a prism lens 1322, and the central shaft 1323, where one end of the central shaft 1323 is connected to the prism support, and the other end is rotatably arranged on the sliding block 1333. In FIG. 6, a surface on which the prism lens 1322 is arranged is forward; and in FIG. 7, a surface opposite to the surface on which the prism lens 1322 is arranged is forward.

In an embodiment, the prism device 13 may further include a cleaning device 134, and in a case that the evaluation parameter is less than or equal to a second threshold, the control unit 11 outputs a cleaning control signal to the cleaning device 134, to enable the cleaning device 134 to clean the prism unit. In a tab detection on-site environment, the prism device 13 may be polluted by pollutants such as dust, dirt, or oil stains and cannot project a clear tab image. Therefore, in a case that the evaluation parameter of the captured tab image is less than or equal to the second threshold indicating a failure in projecting a clear tab image due to pollution by pollutants, the control unit 11 may start the cleaning device 134 to clean the prism unit 132. The second threshold may be set as required. In an embodiment, the cleaning device 134 may include: a wiping strip 1341, in contact with the prism unit 132; and a cleaning driver 1342, configured to enable, according to the cleaning control signal, the wiping strip move in a specified direction to clean the prism unit 132. As shown in FIG. 7, the cleaning driver 1342 may be arranged on the prism support 1321 on a surface opposite to the surface on which the prism lens 1322 is arranged.

According to this embodiment of the present application, the tab detection system can automatically determine an occasion for performing cleaning processing without manual intervention, thereby improving the operating efficiency. In addition, the prism unit can also be cleaned even in a power-on state, so that the photographing efficiency can be improved.

Figure 8:
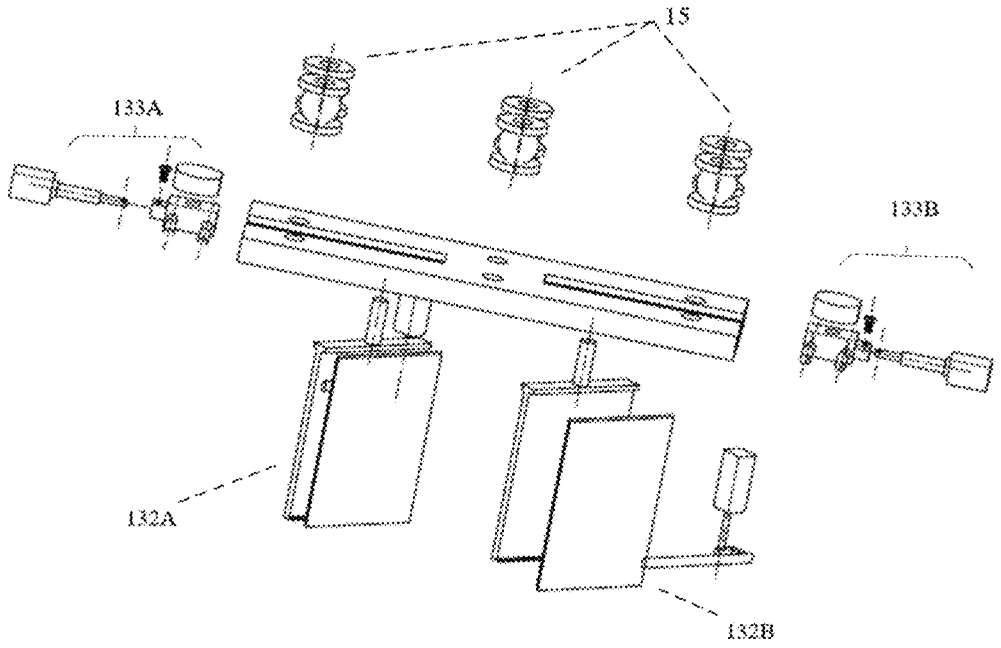
FIG. 8 is a three-dimensional structural diagram of a prism device of a tab detection system disclosed according to an embodiment of the present application.

FIG. 8 is a three-dimensional structural diagram of a prism device of a tab detection system disclosed according to an embodiment of the present application. In this embodiment, the prism device 13 may further include a shock-absorbing device 15, where the shock-absorbing device 15 is arranged on a first side surface (an upper surface in the figure) of the prism table 131, the first side surface is a side surface different from a second side surface (a lower surface in the figure) on which the prism unit 132 is configured, and the prism device 13 may be fixed to the tab detection system 1 through the shock-absorbing device 15. In some embodiments, the shock-absorbing device 15 may be a shock-absorbing ball but is not limited thereto, provided that the component has a shock-absorbing function. In some embodiments, one end of the shock-absorbing device 15 may be fixed to a through hole provided on the prism table, and the other end is fixed to the tab detection system 1. Generally, there are manner vibration sources in the tab detection on-site environment, for example, a transportation mechanism transporting the battery 2 or a transfer mechanism placing the battery 2 in a to-be-detection region. As a result, the prism device 13 may be affected by vibration and a virtual shadow or an optical streak occurs during imaging. According to this embodiment of the present application, by arranging the shock-absorbing device 15, vibration from the tab detection system 1 or the outside is filtered, to prevent imaging deterioration such as a virtual shadow or a focusing loss during imaging, so that a clear tab image can be captured.

In an embodiment, optionally, before detection is performed on the tab, the control unit 11 may control the driving unit 133 to enable at least one of a position or a rotation angle of the prism unit 132 relative to the prism table 131 to be reset to a predetermined value. The predetermined value may be set according to a type of the battery. Gaps between and shapes of tabs of batteries of different types are different, the tab detection system 1 may pre-store, for different battery types, predetermined values of positions or rotation angles corresponding to the types, to initialize the posture of the prism unit 132 into a default optimal posture for each battery type, and the tab detection system 1 then performs adjustment to capture a clear tab image meeting a preset requirement. According to this embodiment of the present application, before detection is performed on the tab, the control unit controls the driving unit to enable at least one of the position or the rotation angle of the prism unit 132 relative to the prism table to be reset to the predetermined value, so that a posture of the prism unit can be initialized into a default optimal posture. Therefore, time required for obtaining a clear tab image through photographing is reduced. In addition, respective corresponding predetermined values can be further set for different battery types.

In an embodiment, optionally, as shown in FIG. 8, the prism device 13 includes two prism units: a first prism unit 132A and a second prism unit 132B, where the first prism unit 132A and the second prism unit 132B respectively include a corresponding first driving unit 133A and a corresponding second driving unit 133B, and the first prism unit 132A and the second prism unit 132B are configured to measure a positive electrode tab and a negative electrode tab respectively. The control unit 11 may control the first driving unit 133A and the second driving unit 133B separately. In addition, corresponding imaging units 12 may be arranged for the first prism unit 132A and the second prism unit 132B respectively, or one imaging unit 12 may be used to capture tab images reflected by the first prism unit 132A and the second prism unit 132B. According to this embodiment, the positive electrode tab and the negative electrode tab of the battery 2 can be detected simultaneously, thereby reducing photographing time and improving the operating efficiency.

Further, in an embodiment, the control unit 11 is configured to: control the first prism unit 132A and the second prism unit 132B to be reset at a preset angle, to enable the first prism unit 132A and the second prism unit 132B to be reset to preset positions according to a gap between the tabs; in response to determining that the difference between the evaluation parameter and the first threshold is outside the predetermined range, enable the first prism unit 132A and the second prism unit 132B to rotate toward a first direction and/or move toward the first direction to increase the gap, where adjustment is performed by using the preset angle and/or a preset distance each time; and in response to determining that a difference between the evaluation parameter of the tab image and the first threshold obtained after the first prism unit 132A and the second prism unit 132B are adjusted is increased compared with that before the adjustment, enable the first prism unit 132A and the second prism unit 132B to rotate toward a second direction opposite to the first direction and/or move toward the second direction.

Figure 9:
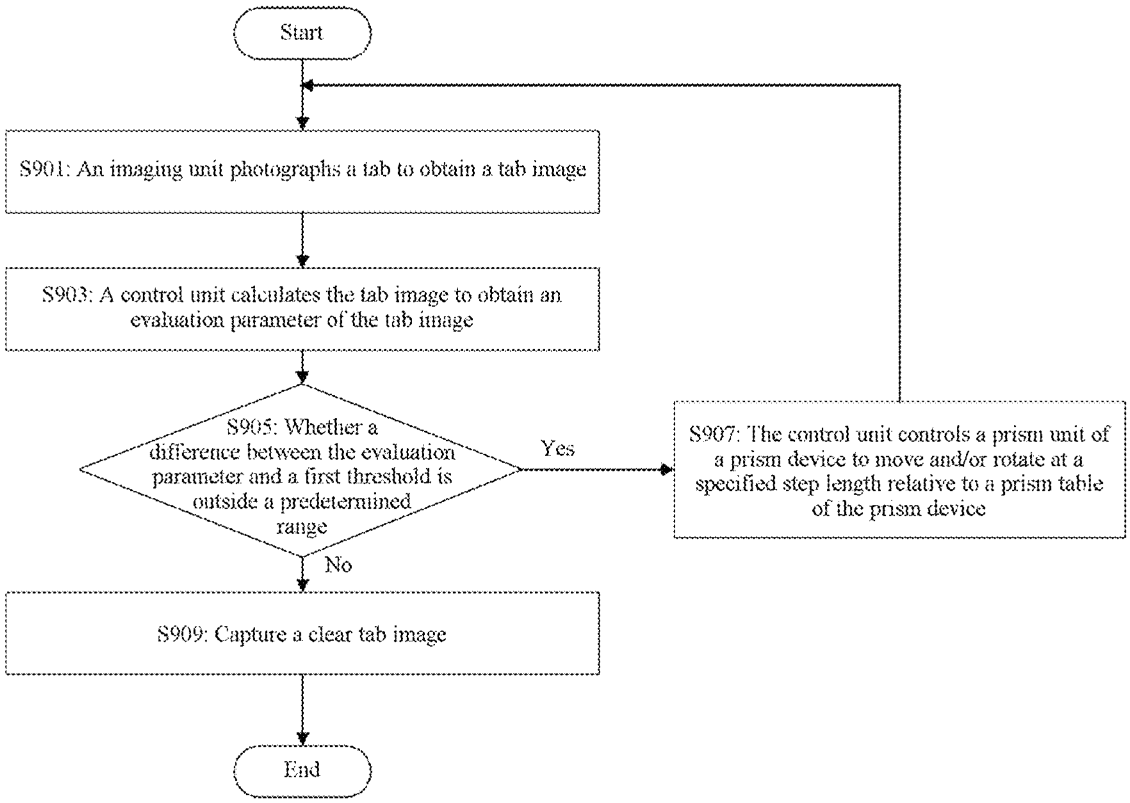
FIG. 9 is a flowchart of a tab detection method according to an embodiment disclosed in the present application.

FIG. 9 is a flowchart of a tab detection method according to an embodiment disclosed in the present application. The tab detection system of this embodiment is applied to a tab detection system. The tab detection system includes: a control unit, an imaging unit, and a prism device, where the imaging unit is configured to photograph a tab through a prism unit of the prism device to obtain a tab image, and the prism device includes: a prism table; the prism unit, configured to project the tab image to the imaging unit through refraction and arranged on the prism table in a manner of being movable relative to the prism table; and a driving unit, configured to enable, according to a driving control signal of the control unit, the prism unit to move and/or rotate relative to the prism table. As shown in FIG. 9, the tab detection method according to an embodiment disclosed in the present application includes the following steps:

Step S901: An imaging unit photographs a tab to obtain a tab image.

Step S903: A control unit calculates the tab image to obtain an evaluation parameter of the tab image.

Step S905: Determine whether a difference between the evaluation parameter and a first threshold is outside a predetermined range.

Step S907: In response to determining that the difference between the evaluation parameter and the first threshold is outside the predetermined range, the control unit controls a prism unit of a prism device to move and/or rotate at a specified step length relative to a prism table of the prism device, and returns to step S901.

Step S909: In response to determining that the difference between the evaluation parameter of the tab image and the first threshold is not outside the predetermined range, it is considered that a clear tab image is captured, and this process ends.

According to the tab detection method of this embodiment, whether a currently captured tab image meets a predetermined requirement can be automatically determined, and the prism unit can be automatically adjusted in a case that the predetermined requirement is not met until the prism unit can capture a clear tab image. Therefore, there is no need to perform manual adjustment and consume a lot of labors and efforts, and a clear tab image can be obtained quickly and automatically.

In an embodiment, optionally, the evaluation parameter may include at least one of a definition of the image, sharpness of the image, and a pixel variance of the image. It should be understood that, the evaluation parameter is not limited thereto, and any parameter that can represent imaging quality of the captured image may be used as the evaluation parameter. For example, in an example, the definition of the image may be represented by using a Brenner gradient function. In another example, the definition of the image may alternatively be represented by using an energy gradient function.

In an embodiment, optionally, the control unit may include an upper computer and a lower computer, where the upper computer controls the imaging unit to capture an image, and the lower computer is arranged on the prism device; and the tab detection method may further include: calculating, by the upper computer in response to capturing the tab image by the imaging unit, the tab image to obtain the evaluation parameter of the tab image, and sending the evaluation parameter to the lower computer; and determining, by the lower computer in response to receiving the evaluation parameter from the upper computer, whether the difference between the evaluation parameter and the first threshold is outside the predetermined range; and if the difference between the evaluation parameter and the first threshold is outside the predetermined range, outputting the driving control signal to the driving unit to enable the prism unit to move and/or rotate at the specified step length relative to the prism table, and sending a request for requesting the imaging unit to capture an image to the upper computer.

According to this embodiment, control of the control unit may be implemented as including control of the two parts: the upper computer and the lower computer. The control part of the upper computer may implement functions of controlling the imaging unit, executing image processing, and calculating the evaluation parameter, and the control part of the lower computer may control, according to an image processing result or the evaluation parameter from the upper computer, the driving unit to adjust the posture of the prism unit. Through such control manner, the upper computer performs an overall control over the system and calculation processing with a relatively large calculation amount, and the lower computer performs control for the corresponding prism device according to a calculation result of the upper computer, so that a more complex embedded system function can be implemented.

In an embodiment, optionally, the prism device may further include a cleaning device, and in a case that the evaluation parameter is less than or equal to a second threshold, the control unit may output a cleaning control signal to the cleaning device, to enable the cleaning device to clean the prism unit. In a tab detection on-site environment, the prism device may be polluted by pollutants such as dust, dirt, or oil stains and cannot project a clear tab image. Therefore, in a case that the evaluation parameter of the captured tab image is less than or equal to the second threshold indicating a failure in projecting a clear tab image due to pollution by pollutants, the cleaning device may be started to clean the prism unit.

According to this embodiment of the present application, the tab detection system can automatically determine an occasion for performing cleaning processing without manual intervention, thereby improving the operating efficiency. In addition, the prism unit can also be cleaned even in a power-on state, so that the photographing efficiency can be improved.

In an embodiment, optionally, before step S901, the driving unit may be controlled to enable at least one of a position or a rotation angle of the prism unit relative to the prism table to be reset to a predetermined value. The predetermined value may be set according to a type of the battery. Gaps between and shapes of tabs of batteries of different types are different, the tab detection system 1 may pre-store, for different battery types, predetermined values of positions or rotation angles corresponding to the types, to initialize the posture of the prism unit 132 into a default optimal posture for each battery type, and the tab detection system 1 then performs adjustment to capture a clear tab image meeting a preset requirement. According to this embodiment of the present application, before detection is performed on the tab, the control unit controls the driving unit to enable at least one of the position or the rotation angle of the prism unit 132 relative to the prism table to be reset to the predetermined value, so that a posture of the prism unit can be initialized into a default optimal posture. Therefore, time required for obtaining a clear tab image through photographing is reduced. In addition, respective corresponding predetermined values can be further set for different battery types.

In an embodiment, optionally, a first prism unit and a second prism unit included in the prism unit may be enabled to be reset at a preset angle, to enable the first prism unit and the second prism unit to be reset to preset positions according to a gap between the tabs; in response to determining that the difference between the evaluation parameter and the first threshold is outside the predetermined range, the first prism unit and the second prism unit are enabled to rotate toward a first direction and/or move toward the first direction to increase the gap, where adjustment is performed by using the preset angle and/or a preset distance each time; and in response to determining that a difference between the evaluation parameter of the tab image and the first threshold obtained after the first prism unit and the second prism unit are adjusted is increased compared with that before the adjustment, the first prism unit and the second prism unit are enabled to rotate toward a second direction and/or move toward the second direction.

According to some embodiments of the present application, FIG. 8 shows a three-dimensional view of an exemplary mechanical structure of a prism device. In this embodiment, a prism device including two prism units (that is, the first prism unit and the second prism unit) is shown, where the first prism unit and the second prism unit include corresponding driving units respectively for driving, so that the first prism unit and the second prism unit may photograph the positive electrode tab and the negative electrode tab of the battery simultaneously, thereby shortening photographing time.

As shown in FIG. 8, in this embodiment, the prism device includes a prism table, a prism unit, a driving unit, a shock-absorbing ball, and a cleaning device.

The prism unit includes a prism lens, a prism support, and a central shaft. The prism lens may be a flat lens for reflecting light but is not limited thereto, provided that the tab image can be projected to the imaging unit. The prism support is configured to fix and hold the prism lens. One end of the central shaft is connected to the prism support, and the other end is connected to a rotating electric cylinder arranged on a sliding block, so that an angle of the prism lens can be changed when the central shaft is driven by the rotating electric cylinder to rotate.

The driving unit includes a side-pushing electric cylinder, the rotating electric cylinder, and the sliding block. A sliding groove is provided on a first surface of the prism table, and the sliding groove extends in a translation direction (a length direction of the prism table in the figure). The sliding block is slidably arranged in the sliding groove. The side-pushing electric cylinder serving as a translation driver is fixed to the prism table, and enables, according to the driving control signal of the control unit, the sliding block to move along the sliding groove in the translation direction. The rotating electric cylinder serving as a rotation driver is arranged on the sliding block, and enables, according to the driving control signal of the control unit, the prism unit to rotate around the central shaft of the prism unit. The electric cylinder is a driver that converts rotational movement of a servo motor into linear movement but is not limited thereto, provided that a rotation speed, a torque, and a position can be precisely controlled by the driver.

The cleaning device includes a wiping strip and a wiping strip driver. The wiping strip is a component configured to clean stains on the prism lens but is not limited thereto, provided that the prism lens can be cleaned. The wiping strip driver is configured to drive the wiping strip to move on a surface of the prism lens to clean the prism lens. The shock-absorbing ball is configured to absorb vibration from the tab detection system or the outside, to prevent imaging deterioration such as a virtual shadow or an optical streak during imaging, so that a cleat tab image can be captured.

Figure 10:
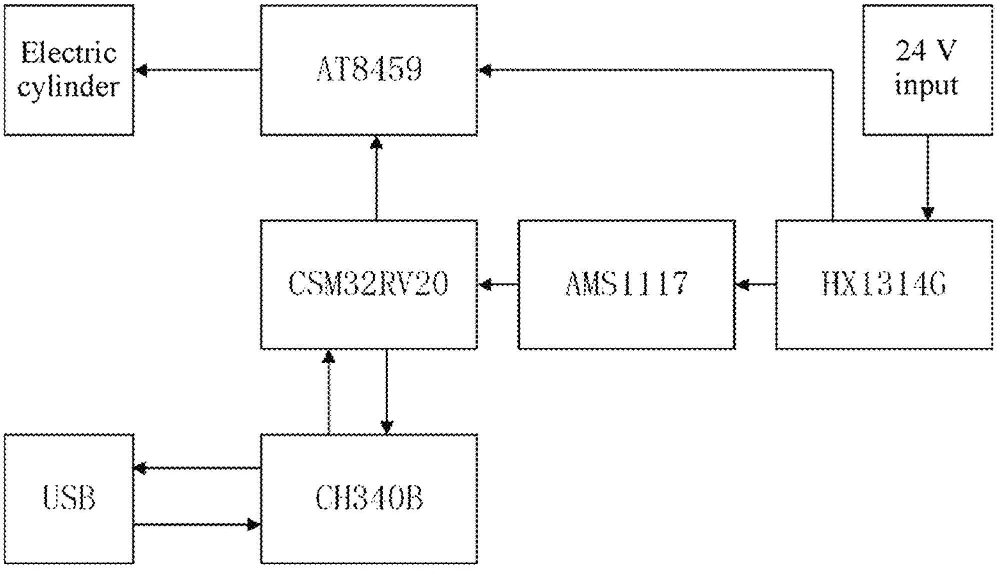
FIG. 10 is a diagram of control logic of an exemplary lower computer of a prism device.

According to some embodiments of the present application, referring to FIG. 10, FIG. 10 shows a diagram of control logic of an exemplary lower computer of a prism device.

In a hardware structure of this embodiment, CSM32RV20 is used as a main control chip, AT8549 is used as an electric cylinder driving chip, HX1314G is used as a power management chip, AMS1117 is used as a voltage stabilizing chip of the main control chip, CH340B is used as a serial-to-USB chip, and PIN4-2.3 is used as an electric cylinder interface. Connection manners and configuration manners of external devices matching the components are conventional, and details are not described herein.

First, a 24 V power supply is connected, the power management chip HX1314G reduces a 24 V voltage to 5 V and then supplies power to the electric cylinder driving chip AT8549, the power management chip is connected to the serial-to-USB chip CH340B, the AMS1117 serves as a voltage stabilizing constant-current chip to supply power, and the AMS1117 chip converts the 5 V voltage into a 3.3 V voltage and supplies power to the main control chip CSM32RV20. The upper computer establishes communication with the prism device through a USB interface, the upper computer sends an angle deflection instruction to the prism, and the main control chip CSM32RV20 converts the instruction into a PWM pulse and sends the PWM pulse into the AT8549 chip to drive a 2-phase 4-wire stepping electric cylinder inserted in interfaces A and B. A stepping motor rotates to control and adjust an angle status of the prism, and after the upper computer sends a prism gap adjustment instruction and the CSM32RV20 chip receives the instruction, the instruction is converted into a PWM pulse signal, and the PWM pulse signal is sent into the AT8549 chip to drive a 2-phase 4-wire stepping electric cylinder inserted in interfaces C and D to perform telescopic movement, to control and adjust a gap size of the prism. Similarly, a wiping electric cylinder serving as a cleaning driver is connected to interfaces E and F, and the wiping electric cylinder is controlled to perform telescopic movement to achieve a cleaning effect.

In an embodiment, photographing adjustment on a tab may be implemented through the following steps:

Step 1. For a battery of a type, the prism unit is manually controlled through the control unit (for example, the upper computer) to adjust a posture of the prism to reach an optimal imaging state.

Step 2. A definition value of an image serving as the evaluation parameter in the optimal state of the prism in Step 1 is quantized through a visual algorithm, and stored as a first threshold associated with the type of the battery.

Step 3. After the battery arrives or is cut and pulled to change a type, the control unit first controls the prism to be reset at a predetermined angle (for example, 45 degrees), where the prism may be reset to a preset position (for example, reset to a center) according to a gap between tabs of the battery.

Step 4. The control unit controls a camera to obtain an image, and calculates definition data of the image through a visual algorithm for comparison with the first threshold.

Step 5. If a difference between the evaluation parameter and the first threshold is outside the predetermined range, the prism unit is rotated toward a first rotation direction (for example, clockwise) and/or moved toward a first translation direction (for example, rightward) to increase the gap, where adjustment is performed by using a preset angle (for example, 1 degree) and/or a preset distance (for example, 1 mm) each time.

Step 6. If the definition value is increased relative to the first threshold after Step 5 is performed once, the prism unit is rotated toward a second rotation direction (for example, anticlockwise) opposite to the first rotation direction and/or moved toward a second translation direction (for example, leftward) opposite to the first translation direction, where adjustment is performed by using the preset angle (for example, 1 degree) and/or the preset distance (for example, 1 mm) each time.

Step 7. Step 5 and Step 6 are performed until the difference between the definition value and the first threshold is not outside the predetermined range.

In an embodiment, the following step may be further included: comparing the definition value with a second threshold, and if the definition value is less than or equal to the second threshold, enabling the cleaning device to clean the prism unit.

Finally, it should be noted that the foregoing embodiments are merely used for describing the technical solutions of the present application, but are not intended to limit the present application. Although the present application has been described in detail with reference to the foregoing embodiments, a person of ordinary skill in the art should appreciate that they can still make modifications to the technical solutions recorded in the embodiments or make equivalent replacements to some or all technical features of the present application. These modifications or replacements do not cause the essence of corresponding technical solutions to depart from the scope of the technical solutions in the embodiments of the present application, and shall all fall within the scope of the claims and specification of the present application. Especially, as long as there is no structural conflict, the various technical features mentioned in each embodiment may be combined in any way. The present application is not limited to the particular embodiments disclosed herein, but includes all technical solutions that fall within the scope of the claims.

What is claimed is:

1. A tab detection system, comprising:

a control unit, configured to output a photographing control signal to an imaging unit and output a driving control signal to a driving unit;

the imaging unit, configured to photograph a tab through a prism unit according to the photographing control signal to obtain a tab image; and a prism device, wherein the prism device comprises:

a prism table;

the prism unit, configured to project the tab image to the imaging unit through refraction and arranged on the prism table in a manner of being movable relative to the prism table; and the driving unit, configured to enable, according to the driving control signal of the control unit, the prism unit to move and/or rotate relative to the prism table; and, wherein the control unit is configured to iteratively perform the following operations until it is determined that a difference between an evaluation parameter of the tab image and a first threshold is not outside a predetermined range:

sending the photographing control signal to the imaging unit;

calculating the tab image captured by the imaging unit to obtain the evaluation parameter of the tab image; and in response to determining that the difference between the evaluation parameter and the first threshold is outside the predetermined range, outputting the driving control signal to the driving unit to enable the prism unit to move and/or rotate at a specified step length relative to the prism table.

2. The tab detection system according to claim 1, wherein the control unit comprises:

an upper computer, configured to control the imaging unit to capture the tab image, calculate, in response to capturing the tab image by the imaging unit, the tab image to obtain the evaluation parameter of the tab image, and send the evaluation parameter to a lower computer; and the lower computer, arranged on the prism device, and configured to: determine, in response to receiving the evaluation parameter from the upper computer, whether the difference between the evaluation parameter and the first threshold is outside the predetermined range; and if the difference between the evaluation parameter and the first threshold is outside the predetermined range, output the driving control signal to the driving unit to enable the prism unit to move and/or rotate at the specified step length relative to the prism table, and send a request for requesting the imaging unit to capture an image to the upper computer.

3. The tab detection system according to claim 1, wherein the driving unit comprises:

a translation direction driving device, configured to enable the prism unit to move in a translation direction; and a rotation direction driving device, configured to enable the prism unit to rotate around a central shaft of the prism unit.

4. The tab detection system according to claim 3, wherein a sliding groove is provided on the prism table, and the sliding groove extends in the translation direction;

the translation direction driving device comprises:

a sliding block, slidably arranged in the sliding groove; and a translation driver, configured to enable, according to the driving control signal of the control unit, the sliding block to move in the translation direction along the sliding groove; and the rotation direction driving device comprises: a rotation driver, wherein the rotation driver is configured to enable, according to the driving control signal of the control unit, the prism unit to rotate around the central shaft of the prism unit, and the rotation driver is arranged on the sliding block.

5. The tab detection system according to claim 4, wherein the prism unit comprises a prism support, a prism lens, and the central shaft, wherein one end of the central shaft is connected to the prism support, and the other end is rotatably arranged on the sliding block.

6. The tab detection system according to claim 3, wherein the translation direction is a length direction of the prism table, and the central shaft is perpendicular to a surface direction of the prism table.

7. The tab detection system according to claim 1, wherein the prism device further comprises a cleaning device; and the control unit is further configured to:

in a case that the evaluation parameter is less than or equal to a second threshold, output a cleaning control signal to the cleaning device, to enable the cleaning device to clean the prism unit.

8. The tab detection system according to claim 7, wherein the cleaning device comprises:

a wiping strip, in contact with the prism unit; and a cleaning driver, configured to enable, according to the cleaning control signal, the wiping strip to move in a specified direction to clean the prism unit.

9. The tab detection system according to claim 1, wherein the prism device further comprises a shock-absorbing device, wherein the shock-absorbing device is arranged on a first side surface of the prism table, the first side surface is a side surface different from a second side surface on which the prism unit is configured, and the prism device is fixed to the tab detection system through the shock-absorbing device.

10. The tab detection system according to claim 1, wherein before detection is performed on the tab, the control unit controls the driving unit to enable at least one of a position or a rotation angle of the prism unit relative to the prism table to be reset to a predetermined value.

11. The tab detection system according to claim 1, wherein the prism device comprises a first prism unit and a second prism unit, wherein the first prism unit comprises a first driving unit, the second prism unit comprises a second driving unit, and the first prism unit and the second prism unit are configured to measure a positive electrode tab and a negative electrode tab respectively.

12. The tab detection system according to claim 11, wherein the control unit is configured to: control the first prism unit and the second prism unit to be reset at a preset angle, to enable the first prism unit and the second prism unit to be reset to preset positions according to a gap between the tabs; in response to determining that the difference between the evaluation parameter and the first threshold is outside the predetermined range, enable the first prism unit and the second prism unit to rotate toward a first rotation direction and/or move toward a first translation direction to increase the gap, wherein adjustment is performed by using the preset angle and/or a preset distance each time; and in response to determining that a difference between the evaluation parameter of the tab image and the first threshold obtained after the first prism unit and the second prism unit are adjusted is increased compared with that before the adjustment, enable the first prism unit and the second prism unit to rotate toward a second rotation direction opposite to the first rotation direction and/or move toward a second translation direction opposite to the first translation direction.

13. A tab detection method, applied to a tab detection system, wherein the tab detection system comprises a control unit, an imaging unit, and a prism device, the imaging unit is configured to photograph a tab to obtain a tab image, and the prism device comprises: a prism table; a prism unit, configured to project the tab image to the imaging unit through refraction and arranged on the prism table in a manner of being movable relative to the prism table; and a driving unit, configured to enable, according to a driving control signal of the control unit, the prism unit to move and/or rotate relative to the prism table; and the tab detection method comprises:

iteratively performing the following operations until it is determined that a difference between an evaluation parameter of the tab image and a first threshold is not outside a predetermined range:

photographing, by the imaging unit, the tab to obtain the tab image;

calculating, by the control unit, the tab image to obtain the evaluation parameter of the tab image; and in response to determining that the difference between the evaluation parameter and the first threshold is outside the predetermined range, controlling, by the control unit, the prism unit to move and/or rotate at a specified step length relative to the prism table of the prism device.

14. The tab detection method according to claim 13, wherein the control unit comprises: an upper computer, configured to control the imaging unit to capture an image; and a lower computer, arranged on the prism device; and the tab detection method comprises:

calculating, by the upper computer in response to capturing the tab image by the imaging unit, the tab image to obtain the evaluation parameter of the tab image, and sending the evaluation parameter to the lower computer; and determining, by the lower computer in response to receiving the evaluation parameter from the upper computer, whether the difference between the evaluation parameter and the first threshold is outside the predetermined range; and if the difference between the evaluation parameter and the first threshold is outside the predetermined range, outputting the driving control signal to the driving unit to enable the prism unit to move and/or rotate at the specified step length relative to the prism table, and sending a request for requesting the imaging unit to capture an image to the upper computer.

15. The tab detection method according to claim 13, wherein the prism device further comprises a cleaning device, and in a case that the evaluation parameter is less than or equal to a second threshold, outputting, by the control unit, a cleaning control signal to the cleaning device, to enable the cleaning device to clean the prism unit.

16. The tab detection method according to claim 13, wherein before detection is performed on the tab, controlling, by the control unit, the driving unit to enable at least one of a position or a rotation angle of the prism unit relative to the prism table to be reset to a predetermined value.

17. The tab detection method according to claim 13, wherein the method comprises performing, by the control unit, controlling a first prism unit and a second prism unit comprised in the prism device to be reset at a preset angle, to enable the first prism unit and the second prism unit to be reset to preset positions according to a gap between the tabs;

in response to determining that the difference between the evaluation parameter and the first threshold is outside the predetermined range, enabling the first prism unit and the second prism unit to rotate toward a first rotation direction and/or move toward a first translation direction to increase the gap, wherein adjustment is performed by using the preset angle and/or a preset distance each time; and in response to determining that a difference between the evaluation parameter of the tab image and the first threshold obtained after the first prism unit and the second prism unit are adjusted is increased compared with that before the adjustment, enabling the first prism unit and the second prism unit to rotate toward a second rotation direction opposite to the first rotation direction and/or move toward a second translation direction opposite to the first translation direction.

* * * * *